US 12,234,538 B2

(12) United States Patent
Suzuki et al.

(10) Patent No.: US 12,234,538 B2
(45) Date of Patent: Feb. 25, 2025

(54) ALUMINUM-PLATED STEEL SHEET, HOT-STAMPED MEMBER, AND METHOD FOR MANUFACTURING HOT-STAMPED MEMBER

(71) Applicant: NIPPON STEEL CORPORATION, Tokyo (JP)

(72) Inventors: Yuki Suzuki, Tokyo (JP); Soshi Fujita, Tokyo (JP); Masahiro Fuda, Tokyo (JP); Hideaki Irikawa, Tokyo (JP); Takeshi Imai, Tokyo (JP); Fumio Eihara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 810 days.

(21) Appl. No.: 17/296,897

(22) PCT Filed: Nov. 29, 2019

(86) PCT No.: PCT/JP2019/046779
§ 371 (c)(1),
(2) Date: May 25, 2021

(87) PCT Pub. No.: WO2020/111230
PCT Pub. Date: Jun. 4, 2020

(65) Prior Publication Data
US 2022/0025498 A1    Jan. 27, 2022

(30) Foreign Application Priority Data

Nov. 30, 2018    (JP) .................................. 2018-225421

(51) Int. Cl.
*C22C 38/58*    (2006.01)
*B21D 22/02*    (2006.01)
(Continued)

(52) U.S. Cl.
CPC ............ *C22C 38/58* (2013.01); *B21D 22/022* (2013.01); *C22C 38/002* (2013.01); *C22C 38/02* (2013.01);
(Continued)

(58) Field of Classification Search
CPC ..... B21D 22/022; C22C 38/002; C22C 38/02; C22C 38/06; C22C 38/42; C22C 21/00; C23C 28/321; C23C 2/12
See application file for complete search history.

(56) References Cited

U.S. PATENT DOCUMENTS

2004/0244874 A1    12/2004  Nakayama et al.
2014/0030544 A1*   1/2014   Maki ....................... C22C 38/04
                                                                     428/653

(Continued)

FOREIGN PATENT DOCUMENTS

EP    3 561 116 A1    10/2019
EP    3 889 312 A1    10/2021

(Continued)

OTHER PUBLICATIONS

International Search Report for PCT/JP2018/021254 (PCT/ISA/210) mailed on Jul. 24, 2018.

(Continued)

*Primary Examiner* — Nicholas A Wang
*Assistant Examiner* — Maxwell Xavier Duffy
(74) *Attorney, Agent, or Firm* — Birch, Stewart, Kolasch & Birch, LLP (57) ABSTRACT

This aluminum-plated steel sheet has a steel sheet and a plating layer formed on a surface of the steel sheet, the plating layer contains one or more A group elements selected from a group consisting of Be, Mg, Ca, Sr, Ba, Sc, Ti, V, Cr, Mn, Fe, Co, Ni, Cu, and Zn, a remainder of Al, Fe, and impurities, a thickness t of the plating layer is 10 to 60 μm, (Continued)

and an average grain size is 2t/3 or less and 15 μm or less in a thickness range from an outermost surface of the plating layer to a ⅔ thickness t position.

6 Claims, 3 Drawing Sheets

(51) Int. Cl.
　　*C22C 38/00*　　(2006.01)
　　*C22C 38/02*　　(2006.01)
　　*C22C 38/06*　　(2006.01)
　　*C22C 38/42*　　(2006.01)
　　*C22C 38/48*　　(2006.01)
　　*C22C 38/50*　　(2006.01)
　　*C22C 38/54*　　(2006.01)
　　*C23C 2/26*　　(2006.01)
　　*C23C 2/28*　　(2006.01)
　　*C25D 1/04*　　(2006.01)

(52) U.S. Cl.
　　CPC .............. *C22C 38/06* (2013.01); *C22C 38/42* (2013.01); *C22C 38/48* (2013.01); *C22C 38/50* (2013.01); *C22C 38/54* (2013.01); *C23C 2/26* (2013.01); *C23C 2/265* (2013.01); *C23C 2/28* (2013.01); *C23C 2/29* (2022.08); *C25D 1/04* (2013.01)

(56) References Cited

U.S. PATENT DOCUMENTS

| 2015/0044499 | A1 | 2/2015 | Maki et al. |
| 2016/0060735 | A1* | 3/2016 | Maki ................ C23C 2/29 428/632 |
| 2016/0068942 | A1 | 3/2016 | Yamanaka et al. |
| 2020/0189233 | A1 | 6/2020 | Suzuki et al. |
| 2020/0347489 | A1 | 11/2020 | Maki et al. |
| 2021/0197525 | A1 | 7/2021 | Fujita et al. |

FOREIGN PATENT DOCUMENTS

| EP | 3 889 315 A1 | 10/2021 |
| JP | 5-195181 A | 8/1993 |
| JP | 2003-34845 A | 2/2003 |
| JP | 2004-211151 A | 7/2004 |
| JP | 2004-339530 A | 12/2004 |
| JP | 2005-238286 A | 9/2005 |
| JP | 2007-302982 A | 11/2007 |
| JP | 4373778 B2 | 11/2009 |
| JP | 2009-293078 A | 12/2009 |
| JP | 2011-137210 A | 7/2011 |
| JP | 2015-131995 A | 7/2015 |
| JP | 6406475 B1 | 10/2018 |
| KR | 10-2004-0007718 A | 1/2004 |
| KR | 20120134709 A | * 12/2012 |
| TW | 201447040 A | 12/2014 |
| TW | 201511933 A | 4/2015 |
| WO | WO 02/103073 A2 | 12/2002 |
| WO | WO 2013/157522 A1 | 10/2013 |
| WO | WO 2017/017484 A1 | 2/2017 |
| WO | WO 2018/117718 A1 | 6/2018 |
| WO | WO 2018/221738 A1 | 12/2018 |
| WO | WO 2019/097729 A1 | 5/2019 |
| WO | WO 2019/194308 A1 | 10/2019 |

OTHER PUBLICATIONS

JIS H 8502: 1999, "Methods of corrosion resistance test for metallic coatings", total of 294 pages.

Office Action issued in TW Patent Application No. 107118998 mailed on Nov. 28, 2018.

\* cited by examiner

ALUMINUM-PLATED STEEL SHEET, HOT-STAMPED MEMBER, AND METHOD FOR MANUFACTURING HOT-STAMPED MEMBER

TECHNICAL FIELD OF THE INVENTION

The present invention relates to an aluminum-plated steel sheet, a hot-stamped member, and a method for manufacturing a hot-stamped member.

Priority is claimed on Japanese Patent Application No. 2018-225421, filed in Japan, Nov. 30, 2018, the content of which is incorporated herein by reference.

RELATED ART

In recent years, there has been a rising demand for suppressing the consumption of chemical fuels in order for environmental protection and the prevention of global warming, and this demand affects a variety of manufacturing industries. For example, vehicles that are indispensable to daily lives or activities as moving means are also not an exception to this demand, and there is a demand for improvement in gas mileages or the like by the weight reduction of vehicle bodies or the like. However, in vehicles, there is a possibility that simply reducing the weight of vehicle bodies may lead to the degradation of safety, which is not permissible in terms of product qualities. Therefore, in the case of reducing the weight of vehicle bodies, it is necessary to ensure appropriate safety.

The majority of the structure of a vehicle is formed of iron, particularly, steel sheets, and the weight reduction of the steel sheets is important for the weight reduction of vehicle bodies. In addition, such a demand for steel sheets rises not only in the vehicle-manufacturing industry but also in a variety of manufacturing industries. As a method for simply reducing the weight of steel sheets to satisfy the above-described demand, the reduction of the sheet thickness of steel sheets can be considered. However, the reduction of the sheet thickness of steel sheets leads to a decrease in the strength of structures. Therefore, in recent years, research and development has been underway regarding steel sheets capable of maintaining or increasing the mechanical strength of structures made of the steel sheets even when thinned more than steel sheets that have been thus far used by increasing the mechanical strength of the steel sheets.

Ordinarily, materials having a high mechanical strength tend to degrade in shape fixability during forming such as bending. Therefore, in the case of working a material into a complex shape, working itself becomes difficult. As one of means for solving this problem regarding formability, a so-called "hot stamping method (also referred to as a hot pressing method, a hot pressing method, a high-temperature pressing method, or a die quenching method in some cases)" is exemplified. In this hot stamping method, a material that is a forming subject is heated to a high temperature, and a steel sheet softened by heating is formed by pressing and, after the forming (or almost at the same time as the forming), cooled. According to this hot stamping method, since the material is once heated to a high temperature to be softened, it is possible to easily press the material. Furthermore, the mechanical strength of the material can be increased by the quenching effect of the cooling after forming. Therefore, a formed article having favorable shape fixability and a high mechanical strength can be obtained using this hot stamping method.

However, in the case of applying this hot stamping method to steel sheets, for members and the like requiring corrosion resistance, it is necessary to perform an antirust treatment or metal coating on the surface of a worked member. Therefore, a surface cleaning step, a surface treatment step, or the like on the member becomes necessary, which degrades the productivity.

With respect to such a problem. Patent Document 1 describes an aluminum-plated steel sheet for hot stamping having an Al-based metal coating that contains Al as a main component and contains Mg and Si on a surface of steel.

Patent Document 2 specifies the composition of a surface of a steel sheet for hot stamping and describes that the amount of AlN in a surface of an Al—Fe alloy layer on a surface of steel is 0.01 to 1 $g/m^2$.

Patent Document 3 describes a vehicle member in which an Al—Fe intermetallic compound layer on a surface of a steel sheet, further having an oxide film on the surface of the Al—Fe intermetallic compound layer, and a bcc layer having Al between the steel sheet and the Al—Fe intermetallic compound layer is present and describes the thickness of the oxide film on the surface of the hot-stamped Al—Fe alloy layer. Patent Document 3 describes that an aluminum-plated steel sheet is heated such that the oxide film has a predetermined thickness, thereby forming the Al—Fe alloy layer up to the surface layer and suppressing a coating film defect or the degradation of adhesion after electrodeposition coating to ensure corrosion resistance after coating.

However, in the aluminum-plated steel sheet for hot stamping described in Patent Document 1, the corrosion resistance after coating is not sufficient after hot stamping. In addition, Patent Document 1 does not specify the composition or structure of the outermost surface and does not clarify the relationship between the composition or structure of the outermost surface and the corrosion resistance after coating.

In Patent Document 2, the corrosion resistance after coating is improved to a certain extent by setting the amount of AlN in the surface of the Al—Fe alloy layer to a predetermined range, but there is room for additional improvement.

In addition, as described in Patent Document 3, even when the structure or thickness of the Al—Fe alloy layer is controlled, the corrosion resistance after coating is not sufficient. A decrease in the adhesion amount of a chemical conversion agent due to the degradation of the reactivity between the oxide film and the chemical conversion agent, or the like is possibly a cause for the insufficient corrosion resistance after coating.

PRIOR ART DOCUMENT

Patent Document

[Patent Document 1] Japanese Unexamined Patent Application. First Publication No. 2003-034845

[Patent Document 2] Japanese Unexamined Patent Application, First Publication No. 2011-137210

[Patent Document 3] Japanese Unexamined Patent Application, First Publication No. 2009-293078

DISCLOSURE OF THE INVENTION

Problems to be Solved by the Invention

As described above, in the related art, there has been a problem in that it is not possible to sufficiently ensure the corrosion resistance after coating of hot-stamped members.

The present invention has been made in view of such a problem, and an object of the present invention is to provide an aluminum-plated steel sheet that is, particularly after hot stamping, excellent in terms of coating material adhesion that significantly affects corrosion resistance after coating and also excellent in terms of corrosion resistance after coating and is preferable for the application to hot-stamped members.

Means for Solving the Problem

In a case where a hot-stamped member is used as, for example, a vehicle component, in a step of manufacturing a vehicle, a chemical conversion film containing zinc phosphate, which serves as a base material of an electrodeposition coating film, is formed, and a resin-based coating film (electrodeposition coating film) is formed on the chemical conversion film. In order to enhance the adhesion of the resin-based coating film (electrodeposition coating film), which is a coating material, it is useful to increase the amount of zinc phosphate crystals precipitated in the chemical conversion film containing zinc phosphate, which is a base material film under the resin-based coating film. In a chemical conversion step, zinc phosphate crystals are precipitated when the concentration of zinc phosphate in a zinc phosphate aqueous solution exceeds the solubility of zinc phosphate. The solubility of zinc phosphate decreases as the pH of the zinc phosphate aqueous solution increases.

The present inventors found that, when a plating layer in a plated steel sheet before hot stamping that has been subjected to a refinement treatment of the metallographic structure of the plating layer by the spraying of particles immediately after plating contains a predetermined amount of one or more elements selected from a group consisting of Group II elements and d-Block elements of Period IV of the periodic table, and the average grain size of a plated surface layer area is controlled, the coating material adhesion improves in a hot-stamped member after hot stamping. That is, it was found that, when the above plated steel sheet is hot-stamped, it is possible to contain a predetermined amount of a Group II element or a d-Block element of Period IV of the periodic table to an oxide film layer that is formed on a surface of the hot-stamped member, and consequently, in the hot-stamped member, the coating material adhesion improves, and the corrosion resistance after coating improves. The reason for the improvement of the coating material adhesion in the hot-stamped member is considered that an oxide of the Group II element or the d-Block element of Period IV of the periodic table formed on the surface by hot stamping increases the pH on the surface of the hot-stamped member while being dissolved in water, whereby, as described above, zinc phosphate crystals are likely to be precipitated, and the coating material adhesion improves.

The present invention has been made based on the above-described finding. The overview of the present invention is as described below.

[1] An aluminum-plated steel sheet according to one aspect of the present invention has a steel sheet and a plating layer formed on a surface of the steel sheet, in which the plating layer contains one or more A group elements selected from a group consisting of Be, Mg, Ca, Sr, Ba, Sc, Ti, V, Cr, Mn, Fe, Co, Ni, Cu, and Zn, a remainder of Al, Fe, and impurities, a thickness t of the plating layer is 10 to 60 μm, and an average grain size is 2t/3 or less and 15 μm or less in a thickness range from an outermost surface of the plating layer to a ⅔ thickness t position.

[2] In the aluminum-plated steel sheet according to [1], a chemical composition of the plating layer may be, by mass %, a total content of the A group elements: 0.001% to 30.00%, Si: 0% to 20.0%. Fe: 0% to 10.0%, and a remainder: Al and impurities.

[3] In the aluminum-plated steel sheet according to [1] or [2], in the chemical composition of the plating layer, by mass %, a total of a Sr content, a Mg content, and a Ca content may be less than 0.001%, and a total content of the A group elements may be 0.05% to 30.00%.

[4] In the aluminum-plated steel sheet according to any one of [1] to [3], in the case of measuring the A group elements in the plating layer in a thickness direction from the outermost surface of the plating layer using GDS, a maximum value of detection intensities of the A group elements in a range from the outermost surface of the plating layer to a ⅓ thickness t position may be 2.0 times or more an average value of detection intensities of the A group elements in a range from the ⅔ thickness t position to a thickness t position.

[5] In the aluminum-plated steel sheet according to any one of [1] to [4], a chemical composition of the steel sheet may be, by mass %, C: 0.1% to 0.4%, Si: 0.01% to 0.60%, Mn: 0.50% to 3.00%, P: 0.05% or less, S: 0.020% or less, Al: 0.10% or less, Ti: 0.01% to 0.10%, B: 0.0001% to 0.0100%, N: 0.010% or less, Cr: 0% to 1.00%, Mo: 0% to 1.00%. Cu: 0% to 1.00%, Ni: 0% to 2.00%. Nb: 0% to 1.00%, Sn: 0% to 1.00%, Ca: 0% to 0.10%, and a remainder: Fe and impurities.

[6] A method for manufacturing a hot-stamped member according to another aspect of the present invention, in which the aluminum-plated steel sheet according to anyone of [1] to [5] is heated to a temperature range of 850° C. to 950° C. and held in the temperature range for 2 minutes or longer, and then hot stamping is performed.

[7] A hot-stamped member according to another aspect of the present invention is a hot-stamped member obtained by hot-stamping the aluminum-plated steel sheet according to any one of [1] to [5], the hot-stamped member having an oxide film layer containing one or more A group elements selected from a group consisting of Be, Mg, Ca, Sr. Ba. Sc, Ti, V, Cr, Mn, Fe, Co, Ni, Cu, and Zn, Al, and oxygen in a surface.

Effects of the Invention

According to the above-described aspects of the present invention, it is possible to provide an aluminum-plated steel sheet that is excellent in terms of adhesion to an electrodeposition coating film (coating material adhesion), particularly, after hot stamping and is preferable for the application to hot-stamped members. In addition, it is possible to provide a method for manufacturing a hot-stamped member in which hot stamping is performed on the aluminum-plated steel sheet and a hot-stamped member obtained by hot-stamping the aluminum-plated steel sheet. This hot-stamped member is excellent in terms of adhesion to an electrodeposition coating film and corrosion resistance after coating.

EMBODIMENTS OF THE INVENTION

Hereinafter, a preferable embodiment of an aluminum-plated steel sheet of the present invention (an aluminum-plated steel sheet according to the present embodiment), a hot-stamped member according to the present embodiment, and manufacturing methods therefor will be described in detail.

(Aluminum-Plated Steel Sheet)

An aluminum-plated steel sheet according to the present embodiment has a steel sheet and a plating layer formed on a surface of the steel sheet, in which the plating layer contains one or more A group elements selected from a group consisting of Be, Mg, Ca, Sr. Ba, Sc, Ti, V, Cr, Mn, Fe, Co, Ni, Cu, and Zn, a remainder of Al, Fe, and impurities, a thickness t (μm) of the plating layer is 10 to 60 μm, and an average grain size is 2t/3 (μm) or less and 15 μm or less in a range from an outermost surface of the plating layer to a position of ⅔ times of thickness t from the surface. It should be noted that crystal grains can be confirmed by etching the steel sheet with a 3% nitric acid alcohol solution (Nital solution) and causing grain boundaries to appear.

In the aluminum-plated steel sheet according to the present embodiment (aluminum-plated steel sheet), the average grain size of the plating layer is controlled to be small, and there are a number of grain boundaries. As a result, the area of interfaces with an atmospheric gas such as the atmosphere during heating for hot stamping that is subsequently performed becomes large. Since the A group elements have a high affinity to the atmospheric gas, the A group elements concentrate in the surface layer during heating, and the proportion of the A group elements in an oxide film layer that is formed on the surface layer area of a member after hot stamping (hot-stamped member) becomes large.

In the hot-stamped member, the A group elements are contained in the oxide film layer mainly in an oxide form. When a chemical conversion is performed on the outermost surface (the surface of the oxide film layer) of the above-described hot-stamped member, the presence of the oxide of the A group elements on the outermost surface of the hot-stamped member increases the pH of a chemical conversion liquid in the interface between the oxide film layer and the chemical conversion liquid. Therefore, the amount of zinc phosphate crystals precipitated becomes large. That is, so-called chemical convertibility is enhanced. In addition, the increase in the amount of zinc phosphate crystals precipitated improves the adhesion (coating material adhesion) of an electrodeposition coating film that is electrodeposition-coated after the chemical conversion. In addition, the enhancement of the adhesion of the electrodeposition coating film improves corrosion resistance after coating.

Hereinafter, the plating layer that is included in the aluminum-plated steel sheet according to the present embodiment and the steel sheet in which the plating layer is formed will be described. In the present embodiment, the application to a hot-stamped member will be mainly described, but the application of the aluminum-plated steel sheet according to the present embodiment is not limited to the hot-stamped member.

(Plating Layer)

The plating layer is formed on a surface of the steel sheet. The plating layer contains A group elements with a remainder of Al, Fe. and impurities and may further contain Si. The Al content is preferably set to 75% or more. The upper limit of the Al content does not need to be particularly specified, but may be, for example, 99.999%.

The A group elements are Group II elements or d-Block elements of Period IV in the periodic table. In the present embodiment, the Group II elements in the periodic table refer to Be, Mg, Ca, Sr. and Ba, and d-Block elements of Period IV refer to Sc, Ti, V, Cr, Mn, Fe, Co. Ni, Cu. and Zn. The plating layer of the aluminum-plated steel sheet according to the present embodiment needs to contain one or more of the above-described elements.

In order to improve the adhesion to an electrodeposition coating film and the corrosion resistance after coating, the A group elements may exclude Fe and may be limited to Be. Mg, Ca. Sr, Ba, Sc, Ti, V, Cr, Mn, Co. Ni, Cu. and Zn. In addition, among the A group elements, Sr, Mg. and Ca are particularly preferable since Sr. Mg. and Ca significantly improve the adhesion and the durability after coating of the electrodeposition coating film even in a small amount of 0.100% or less.

As a preferable chemical composition of the plating layer, a chemical composition containing, by mass %, a total content of the A group elements: 0.001% to 30.00%, Si: 0% to 20.0%, Fe: 0% to 10.0% with a remainder of Al is exemplified. Although the effect can be obtained as long as the A group elements are contained, but the total content of the A group elements is preferably set to 0.001% or more. In order to further improve the adhesion and the corrosion resistance after coating of the electrodeposition coating film, the lower limit of the total content of the A group elements is more preferably as high as possible such as 0.01%, 0.03%, 0.05%, 0.07%, or 0.09%. As described above, since Sr, Mg. and Ca exhibit the effect even in a small amount, the lower limit of the total content of the A group elements may be set to different values in a case where Sr, Mg. and Ca are contained and in a case where Sr. Mg, and Ca are not contained. For example, in a case where the lower limit of the total content of Sr, Mg, and Ca is set to 0.001%, 0.01%, 0.02%, 0.03%, 0.04%, 0.06%, or 0.08%, but the lower limit of the total content of Sr, Mg, and Ca does not satisfy this value, the lower limit of the total content of the A group elements may be set to 0.05%, 0.10%, 0.15%, or 0.20%. That is, for example, in a case where the total content of Sr, Mg, and Ca is less than 0.001%, the total content of the A group elements may be set to 0.05% to 30.00%.

In addition, when the total content of the A group elements exceeds 30.00%, the alloying cost of a plating bath or the like increases, which is not preferable. In order to satisfy both the required performance as a vehicle member and the manufacturing cost, the upper limit of the total content of the A group elements may be set to 15.0%, 10.0%, 5.00%, 3.00%, 2.00%, 1.50%, or 1.00%.

When the Si content exceeds 20.0%, the amount of an alloy generated in the plating bath increases, and the frequency of removing a precipitate increases, which is not preferable. Therefore, the upper limit of the Si content is set to 20.0%. If necessary, the upper limit of the Si content may be set to 15.0%, 12.0%, or 10.0%.

The upper limit of the Fe content is set to 10.0%. If necessary, the upper limit of the Fe content may be set to 7.0%, 5.0%, or 4.0%. Si and Fe are not necessarily contained, and the lower limits of the contents thereof are 0%. If necessary, the lower limits of the Si content and the Fe content may be set to 0.1%, respectively.

In addition, the metallographic structure of the plating layer may include one or more of an Al phase, an Al—Si phase, a Si phase, an Al—Fe alloy phase, or an Al—Fe—Si alloy phase.

The plating layer may be formed on both surfaces of the steel sheet, but may be present on one surface. The chemical composition of the plating layer can be analyzed by the offline X-ray fluorescence method described in Annex JB of JIS G 3314: 2011.

(Thickness of Plating Layer t: 10 to 60 μm)

The thickness t of the plating layer is in a range of 10 μm to 60 μm. When the thickness t is set to 10 μm or more, it is possible to improve the corrosion resistance of the hot-stamped member. In addition, when the thickness is set to 60 μm or less, an Al—Fe intermetallic compound layer is formed up to the outermost layer or near the outermost layer, and thus the corrosion resistance of the hot-stamped member improves. The lower limit of the thickness t of the plating layer may be set to 13 μm, 15 μm, 20 μm, or 25 μm, and the upper limit of the thickness t may be set to 55 μm, 50 μm, or 45 μm.

The thickness of the plating layer can be measured by observation using glow discharge spectroscopy (GDS) or the like.

In the present embodiment, up to a position where the detection intensity of Al is reduced up to 1/20 of the maximum value is determined as the plating layer, using GDS. Specifically, in a case where Al is measured by GDS for 1000 seconds in the thickness direction from the surface of the plating layer at intervals of 0.1 seconds and a sputtering rate of 0.060 μm/second, the measurement time taken for the detection intensity to reach 1/20 of the maximum value is represented by T [seconds], and T is multiplied by the sputtering rate, thereby obtaining the thickness of the plating layer. Here, in a case where the detection intensity of Al is detected to reach 1/20 of the maximum value at a plurality of points, the longest time of the measurement times taken for the detection intensity to reach 1/20 of the maximum value is represented by T [seconds], and T is multiplied by the sputtering rate, thereby obtaining the thickness of the plating layer.

(Average Grain Size in Range from Outermost Surface of Plating Layer to a Position of 2/3 Times of Thickness t (2t/3 Position): 2t/3 or Less and 15 μm or Less)

The average grain size from the outermost surface of the plating layer to the 2t/3 position is 2t/3 (μm) or less and 15 μm or less in a case where the thickness of the plating layer is represented by t. When the average grain size is set to 2t3 (μm) or less and 15 μm or less, the area of grain boundaries becomes large, and the interface area with an atmospheric gas such as the atmospheric air during heating in hot stamping that is subsequently performed becomes large. Therefore, the amount of zinc phosphate crystals precipitated becomes large. That is, so-called chemical convertibility is enhanced. In addition, the enhancement of the chemical convertibility improves the adhesion of an electrodeposition coating film that is electrodeposition-coated after the chemical conversion. The enhancement of the adhesion of the electrodeposition coating film improves the corrosion resistance after coating.

After hot stamping, the corrosion resistance after coating improves as described above. However, even in a case where hot stamping is not performed, when the average grain size is 2t/3 (μm) or less and 15 μm or less, the area of the interfaces with the coating film becomes large, whereby the adhesion is enhanced, and the corrosion resistance after coating improves.

The average grain size of the plating layer is obtained as follows.

Figure 1:
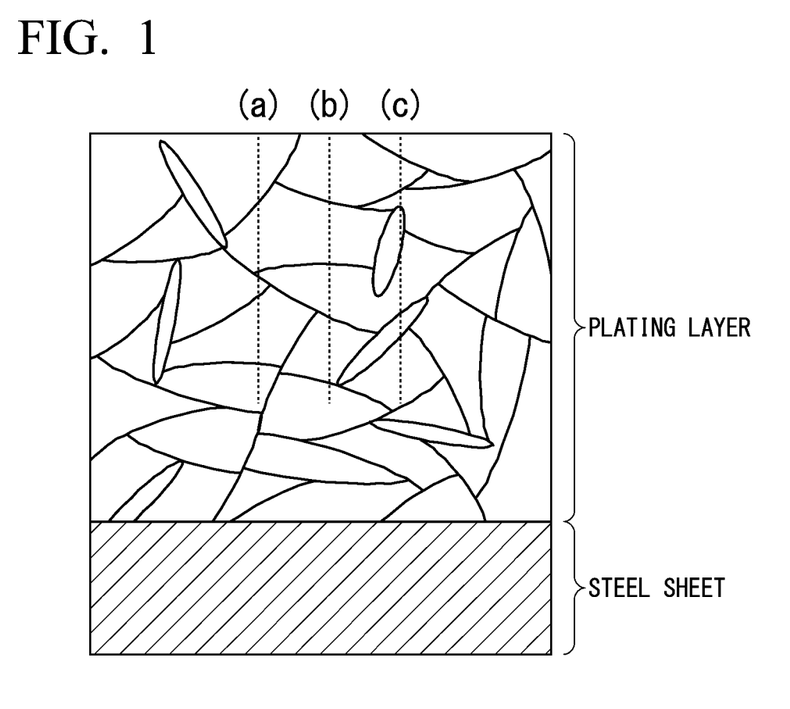
FIG. 1 is a schematic view showing a method for measuring an average grain size of a plating layer in an aluminum-plated steel sheet according to the present embodiment.

A sample is collected from the aluminum-plated steel sheet such that a cross section of the plating layer in the thickness direction becomes the observation surface. The collected sample is etched with a 3% nitric acid alcohol solution (Nital solution) to cause grain boundaries to appear, and an image is captured using a scanning electron microscope (SEM) such that a range from the outermost surface of the plating layer to the steel sheet is included in the range. On this photograph, as shown in FIG. 1, a line segment having a length of 2t/3 (t=the thickness (μm) of the plating layer) is drawn in the thickness direction from the outermost surface of the plating layer, the number of intersection points with grain boundaries is represented by n, and the value obtained by dividing the line segment length (2t/3) by n, that is, (2t/3n) is regarded as the average grain size. Three line segments are drawn as described above at random positions at intervals of 5 μm as shown by (a), (b), and (c) in the drawing, average grain sizes are obtained at the positions of the respective line segments, and a value obtained by averaging the average grain sizes is regarded as the average grain size of the plating layer in a range from the outermost surface to the 2/3 thickness t position (2t/3 position).

In a case where n is 0, it is not possible to calculate 2t/3n. However, in this case, since the grain size is larger than 2t/3 in the observation image, the average grain size is determined not to be 2t/3 or less.

In addition, in the calculation of the number n of intersection points, as described in Annex C.2.2 of JIS G0551: 2013, in a case where a line segment intersects with a triple point, n is regarded as 1.5 at that point.

(Maximum Value of Detection Intensities of a Group Elements in Range from Outermost Surface of Plating Layer to 1/3 Thickness t Position being 2.0 Times or More Average Value of Detection Intensities of a Group Elements in Range from 2/3 Thickness t Position (2t/3 Position) from Outermost Surface to Thickness t Position)

The maximum value of the detection intensities of the A group elements in a range from the outermost surface to a t/3 position is preferably 2.0 times or more the average value of the detection intensities of the A group elements in a range from the 2t/3 position to a thickness t position (almost the same as the position of the interface between the plating layer and the steel sheet). That is, it is preferable that the A group elements concentrate at a position close to the surface of the plating layer. Particularly, since Sr, Mg, and Ca have a high affinity to oxygen, these elements have a high tendency of concentrating at a position near the surface of the plating layer and have an effect of significantly improving corrosion resistance after coating even in a small amount.

When the ratio between the above-described detection intensities is set to 2.0 times or more, the proportion of the A group elements in the surface layer area of a member after hot stamping becomes high, and the proportion of the A group elements present on the surface of the oxide film layer also becomes high. Therefore, the pH of the chemical conversion liquid in the interface between the hot-stamped member and the chemical conversion liquid increases. As a result, the amount of zinc phosphate crystals precipitated during the chemical conversion becomes large, and so-called chemical convertibility is enhanced. In addition, the enhancement of the chemical convertibility improves the adhesion of an electrodeposition coating film that is electrodeposition-coated after the chemical conversion. As a result, the corrosion resistance after coating improves.

The maximum value of the detection intensities of the A group elements in the range from the outermost surface to the ⅓ thickness t position (t/3 position) and the average value of the detection intensities of the A group elements in the range from the ⅔ thickness t position (2t/3 position) from outermost surface to the thickness t position (t position) are obtained by the following method.

Figure 2:
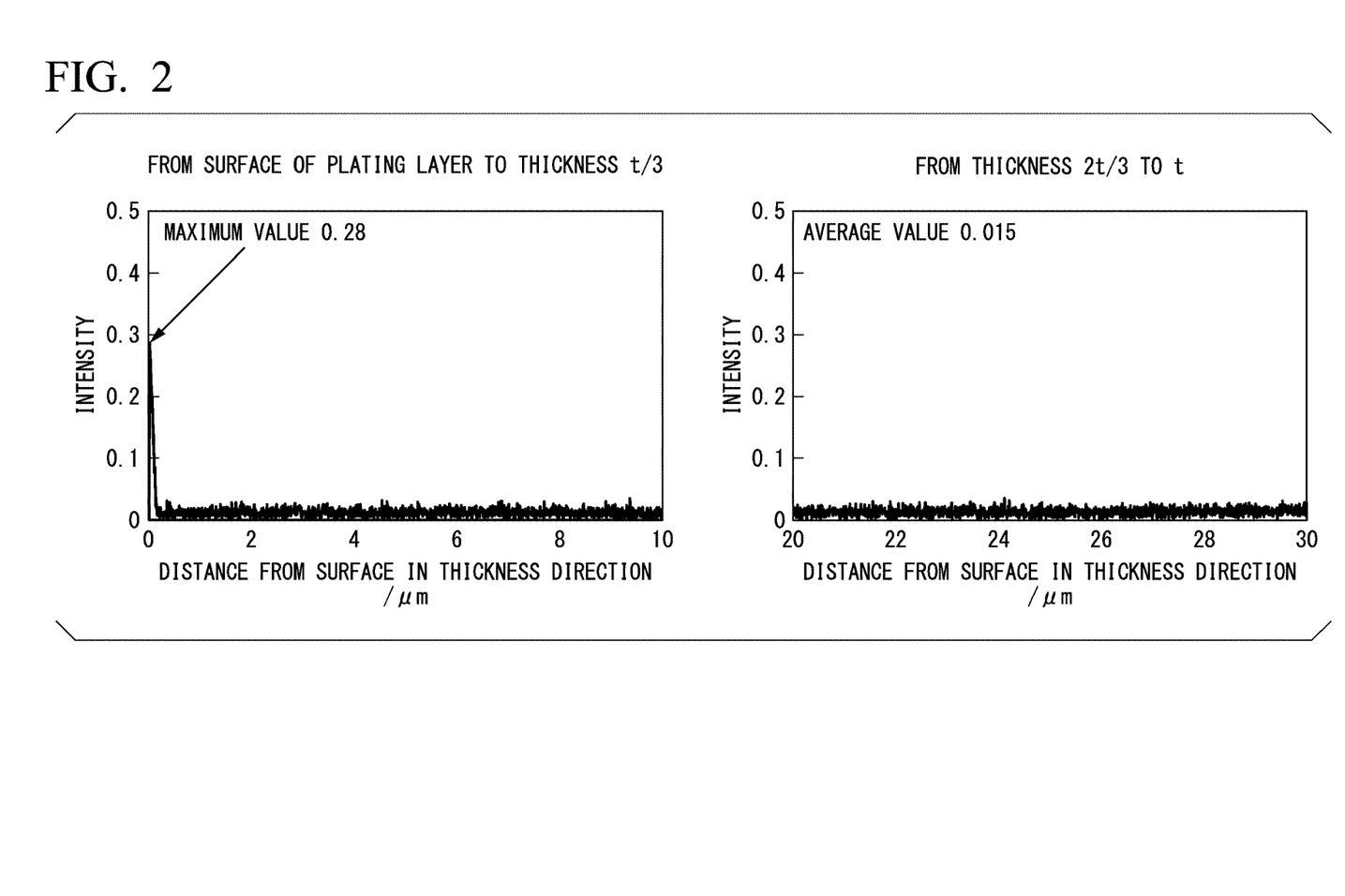
FIG. 2 is an example of measurement results of A group elements in the plating layer in a thickness direction from an outermost surface of the plating layer using GDS for the aluminum-plated steel sheet according to the present embodiment.

After the thickness t of the aluminum-plated layer is measured as described above, the A group elements are measured by GDS in the thickness direction from the surface of the plating layer at intervals of 0.1 seconds and a sputtering rate of 0.060 μm/second, and the maximum value of the detection intensities of the A group elements in the range from the outermost surface to the t/3 position and the average value of the detection intensities from the 2t/3 position to the t position are obtained. In a case where a plurality of the A group elements are contained, the maximum value and the average value are determined using the element having the highest detection intensity. FIG. 2 is an example of the measurement results of the A group elements in the plating layer in the thickness direction from the outermost surface of the plating layer using GDS for the aluminum-plated steel sheet according to the present embodiment.

(Steel Sheet)

The steel sheet that the aluminum-plated steel sheet according to the present embodiment includes is not particularly limited as long as the steel sheet can be preferably used in the hot stamping method. As a steel sheet applicable to the hot-stamped member according to the present embodiment, for example, a steel sheet having a chemical composition containing, by mass %, C: 0.1% to 0.4%, Si: 0.01% to 0.60%, Mn: 0.50% to 3.00%, P: 0.05% or less, S: 0.020% or less. Al: 0.10% or less, Ti: 0.01% to 0.10%, B: 0.0001% to 0.0100%. N: 0.010% or less, Cr: 0% to 1.00%, and Mo: 0% to 1.00% with a remainder of Fe and impurities can be exemplified. As the form of the steel sheet, for example, a steel sheet such as a hot-rolled steel sheet or a cold-rolled steel sheet can be exemplified. Hereinafter, a preferable range of each component contained in the steel sheet will be described.

C: 0.1% to 0.4%

C is contained in order to ensure an intended mechanical strength. In a case where the C content is less than 0.1%, the mechanical strength cannot be sufficiently improved, and the effect of the containing of C becomes weak.

On the other hand, in a case where the C content exceeds 0.4%, it is possible to further harden and improve the strength of the steel sheet, but elongation and the reduction in area are likely to decrease.

Therefore, the C content is desirably in a range of 0.1% or more and 0.4% or less by mass %.

Si: 0.01% to 0.60%

Si is one of the strength improvement elements that improve the mechanical strength of steel and, similar to C, is contained in order to ensure an intended mechanical strength. In a case where the Si content is less than 0.01%, the strength improvement effect is not easily exhibited, and the mechanical strength cannot be sufficiently improved.

Meanwhile, Si is also an easily oxidizing element. Therefore, in a case where the Si content exceeds 0.60%, due to the influence of a Si oxide formed on the surface layer of the steel sheet, during molten Al plating, the wettability degrades, and there is a concern that a non-plated part may be generated.

Therefore, the Si content is desirably in a range of 0.01% or more and 0.60% or less by mass %.

Mn: 0.50% to 3.00%

Mn is one of the strengthening elements that strengthen steel and is also one of the elements that enhance hardenability. Furthermore. Mn is effective for preventing hot embrittlement attributed to S, which is one of the impurities. In a case where the Mn content is less than 0.50%, these effects cannot be obtained. Therefore, the Mn content is set to 0.50% or more.

On the other hand, since Mn is an element that accelerates the formation of austenite, in a case where the Mn content exceeds 3.00%, retained austenite excessively increases, and there is a concern that the strength may decrease. Therefore, the Mn content is desirably in a range of 0.50% or more and 3.00% or less by mass %.

P: 0.05% or Less

P is an impurity that is contained in steel. There is a case where P that is contained in the steel sheet is segregated in grain boundaries in the steel sheet, degrades the toughness of the base metal of a hot-stamped formed body, and degrades the delayed fracture resistance of the steel sheet. Therefore, the P content of the steel sheet is preferably 0.05% or less, and the P content is preferably set to be as small as possible. The P content may be 0%.

S: 0.020% or Less

S is an impurity that is contained in steel. There is a case where S that is contained in the steel sheet forms a sulfide, degrades the toughness of the steel sheet, and degrades the delayed fracture resistance of the steel sheet. Therefore, the S content of the steel sheet is preferably 0.020% or less, and the S content of the steel sheet is preferably set to be as small as possible. The S content may be 0%.

Al: 0.10% or Less

Al is ordinarily used for the purpose of deoxidizing steel. However, in a case where the Al content is high, the Ac3 point of the steel sheet increases. When the Ac3 point of the steel sheet increases, it is necessary to increase the heating temperature necessary to ensure the hardenability of steel during hot stamping, which is not desirable in terms of manufacturing by hot stamping. Therefore, the Al content of the steel sheet is preferably 0.10% or less. The Al content is preferably 0.05% or less and more preferably 0.01% or less.

Ti: 0.01% to 0.10%

Ti is one of the elements having an effect of improving the strength of steel. In addition, Ti is also an element having an effect of improving the oxidation resistance. In a case where the Ti content is less than 0.01%, the strength improvement effect or the oxidation resistance improvement effect cannot be obtained. These effects are exhibited when the TI content is 0.01% or more.

On the other hand, when Ti is excessively contained, there is a concern that, for example, a carbide or a nitride may be formed and steel may be softened. Particularly, in a case where the Ti content exceeds 0.10%, there is a high possibility that an intended mechanical strength cannot be obtained.

Therefore, the Ti content is desirably in a range of 0.01% or more and 0.10% or less by mass %.

B: 0.0001% to 0.0100%

B is an element having an effect of improving the strength of steel by acting during quenching. In a case where the B content is less than 0.0001%, such a strength improvement effect is weak.

On the other hand, in a case where the B content exceeds 0.0100%, there is a concern that an inclusion may be formed, the steel sheet may become brittle, and the fatigue strength may decrease.

Therefore, the B content is desirably in a range of 0.0001% or more and 0.0100% or less by mass %.

N: 0.010% or Less

N is an impurity that is contained in steel. There is a case where N that is contained in the steel sheet forms a nitride and degrades the toughness of the steel sheet. Furthermore, in a case where B is contained in the steel sheet, there is a case where N that is contained in the steel sheet bonds to B to decrease the amount of a solid solution of B and weakens the hardenability improvement effect of B. Therefore, the N content of the steel sheet is preferably 0.010% or less, and the N content of the steel sheet is more preferably set to be as small as possible. The N content may be 0%.

In addition, the aluminum-plated steel sheet according to the present embodiment may further contain Cr, Mo, Cu, Ni, Nb, Sn, and Ca in the following ranges. However, since these elements are not essential, the lower limits are 0%.

Cr: 0% to 1.00%

Mo: 0% to 1.00%

In order to improve the hardenability of the steel sheet, any one or both of Cr and Mo may be contained. In the case of obtaining the effect, the contents of both elements are preferably set to 0.01% or more. On the other hand, even when the contents are set to 1.00% or more, the effect is saturated, and thus the cost increases. Therefore, the contents are preferably set to 1.00% or less.

Cu: 0% to 1.00%

Ni: 0% to 2.00%

Cu and Ni have an action of increasing the strength of the hot-stamped member (the steel sheet after hot stamping). Therefore, Cu and Ni may be contained as necessary.

In a case where it is necessary to obtain the above-described effect, the contents of Cu and Ni are preferably 0.01% or more, respectively.

On the other hand, even when the Cu content exceeds 1.00%, and the Ni content exceeds 2.00%, the effect is saturated, and thus the cost increases. Therefore, the Cu content is preferably set to 1.00% or less, and the Ni content is preferably set to 2.00% or less.

Nb: 0% to 1.00%

Nb is an element having an action of increasing the strength of the hot-stamped member through the refinement of the metallographic structure. In order to obtain this effect, Nb may be contained as necessary.

In a case where it is necessary to obtain the above-described effect, the Nb content is preferably set to 0.01% or more.

On the other hand, even when the Nb content exceeds 1.00%, the effect is saturated, and thus the cost increases. Therefore, the Nb content is preferably set to 1.00% or less.

Sn: 0% to 1.00%

Sn is an element that improves the corrosion resistance of steel in a corrosive environment. Therefore. Sn may be contained. In order to obtain the above-described effect, the Sn content is preferably set to 0.01% or more.

However, when the Sn content exceeds 1.00%, the grain boundary strength decreases, and the toughness degrades. Therefore, in a case where Sn is contained, the Sn content is preferably set to 1.00% or less.

Ca: 0% to 0.10%

Ca is an element having an action of improving the toughness of the hot-stamped member by adjusting the shape of an inclusion. Therefore, Ca may be contained as necessary. In a case where it is necessary to obtain the above-described effect, Ca is preferably contained in a content of 0.01% or more.

On the other hand, in a case where the Ca content is more than 0.10%, the above-described effect is not only saturated, but an excessive cost is also generated. Therefore, even in a case where Ca is contained, the Ca content is preferably set to 0.10% or less.

The remainder other than the above-described components is Fe and impurities. The steel sheet may contain, other than the above-described remainder, impurities that is mixed into the steel sheet during the manufacturing step or the like. Examples of the impurity include phosphorus (P), nitrogen (N), sulfur (S), which have been described above, additionally, zinc (Zn), cobalt (Co), and the like.

(Hot-Stamped Member)

A hot-stamped member can be produced by performing heating and quenching by the hot stamping method on the aluminum-plated steel sheet. In a case where the aluminum-plated steel sheet has the above-described preferable chemical composition, it is possible to produce a hot-stamped member having a tensile strength of approximately 1000 MPa or more by hot stamping.

In addition, in the hot stamping method, since it is possible to perform pressing on the aluminum-plated steel sheet in a state of being softened at a high temperature, the aluminum-plated steel sheet can be easily formed into the hot-stamped member.

Figure 3:
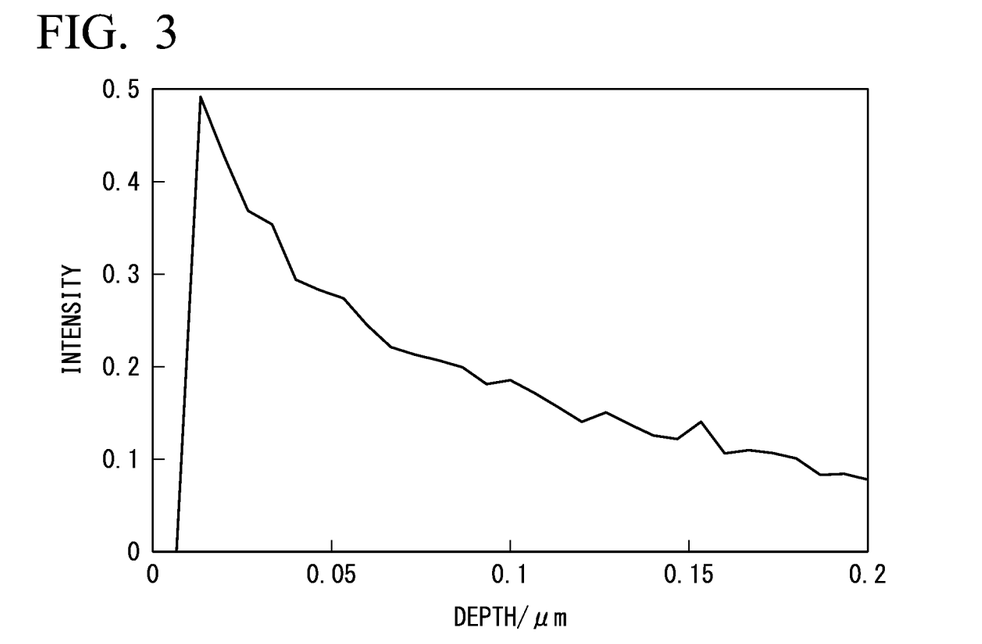
FIG. 3 is an example of measurement results of A group elements in a thickness direction from an outermost surface of an oxide film layer using GDS in a hot-stamped member obtained by hot-stamping the aluminum-plated steel sheet according to the present embodiment.

In the above-described aluminum-plated steel sheet, the area of the interface (interface area) between the steel sheet and the atmospheric gas such as the atmospheric air becomes large during heating for hot stamping. Since the A group elements have a high affinity to the atmospheric gas, the amount of the A group elements concentrating in the surface layer increases, and the proportion of the A group elements in the outermost surface of the oxide film layer becomes high. FIG. 3 is an example of the measurement results of the A group elements in the thickness direction from the outermost surface of the oxide film layer using GDS in the hot-stamped member obtained by hot-stamping the aluminum-plated steel sheet according to the present embodiment.

In a hot stamping step, the plating layer (the Al plating layer) is melted by heating the aluminum-plated steel sheet to the melting point of the plating layer or higher, at the same time, Fe and Al mutually diffuse between the steel sheet and the Al plating layer, and an Al phase in the Al plating layer changes to an Al—Fe alloy phase, whereby an Al—Fe intermetallic compound layer is formed. In a case where Si is contained in the Al plating layer, the Al phase in the Al plating layer also changes to an Al—Fe—Si alloy phase. Since the melting points of the Al—Fe alloy phase and the Al—Fe—Si alloy phase are approximately 1150° C. and are higher than the upper limit of the heating temperature of an ordinary hot stamping step, the formation of the alloy phases leads to the precipitation of the alloy phases in the surface of the steel sheet and the formation of the Al—Fe intermetallic compound layer. There is a plurality of kinds of Al—Fe alloy phases and Al—Fe—Si alloy phases, and, when heated at a high temperature or heated for a long period of time, the Al—Fe alloy phase and the Al—Fe—Si alloy phase change to an alloy phase having a higher Fe concentration. In addition, in a case where the A group elements are contained in the Al—Fe intermetallic compound layer, the A group elements can be present in a variety of forms such as an intermetallic compound, a solid solution, and the like.

(Oxide Film Layer on Surface Layer of Hot-Stamped Member)

On a surface side (a portion corresponding to the surface layer area of the plating layer (opposite to the steel sheet) in the aluminum-plated steel sheet before hot stamping) of the hot-stamped member obtained by hot-stamping the aluminum-plated steel sheet according to the present embodiment, as the outermost surface layer of the hot-stamped member, an oxide film layer is formed. This oxide film layer is generated by the oxidation of the surface layer of the plating layer in the aluminum-plated steel sheet in a heating process of hot stamping at the time of manufacturing the hot-stamped member. The oxide film layer includes the A group elements, Al, oxygen, and impurities. The oxide film layer may further contain any one or both of Fe and Si. Regarding Fe and Si, there is a case where some of Fe and Si contained in the Al—Fe intermetallic compound layer are mixed into the oxide film layer during the formation of the oxide film layer.

The A group elements that are contained in the oxide film layer are Group II elements and d-Block elements of Period IV in the periodic table. In the present embodiment, the Group II elements in the periodic table refer to Be. Mg. Ca, Sr, and Ba, and d-Block elements of Period IV refer to Sc, Ti, V, Cr, Mn, Fe, Co. Ni. Cu, and Zn. When the oxide film layer in the hot-stamped member obtained by hot-stamping the aluminum-plated steel sheet according to the present embodiment contains one or more of these elements, a coating material adhesion improvement effect can be obtained. The A group elements are present mainly as an oxide, but some of the A group elements may also be present in a form of a pure element or a compound other than the oxide. In addition, the form of the oxide is also not limited. In the oxide film layer, elements other than the A group elements are also preferably present in an oxide state. For example, it is preferable that Al is present as aluminum oxide and other impurities are present as oxides of the respective impurities. In addition, in a case where Si is contained in the oxide film layer, Si is preferably present as a silicon oxide, and, in a case where Fe is contained, Fe is preferably present as an iron oxide. In addition, each of the A group elements, Al, Si, and Fe may be contained in a form of a complex oxide with other elements.

The oxides of the A group elements are classified into basic oxides. In a chemical conversion step, some of a basic oxide containing the A group element in the oxide film (particularly, present in the surface of the oxide film layer) dissolves when coming into contact with a phosphoric acid chemical conversion liquid (hereinafter, referred to as the chemical conversion liquid) and increases the pH of a solution in the interface between the chemical conversion liquid and the oxide film layer that is included in the hot-stamped member. Meanwhile, when the pH increases, the solubility of zinc phosphate that is contained in the chemical conversion liquid decreases, and the amount of a crystal being precipitated increases. Therefore, an increase in the pH in the interface between the surface of the oxide film layer and the chemical conversion liquid increases zinc phosphate crystals that are precipitated on the surface of the oxide film layer.

(Method for Manufacturing Aluminum-Plated Steel Sheet and Method for Manufacturing Hot-Stamped Member)

Next, an example of methods for manufacturing the aluminum-plated steel sheet and the hot-stamped member according to the present embodiment will be described. The manufacturing methods described below are an example in which Al plating is performed on a steel sheet to produce an aluminum-plated steel sheet, and a hot stamping step is performed on the aluminum-plated steel sheet, thereby forming an Al—Fe intermetallic compound layer and an oxide film layer on the surface of the steel sheet. However, the methods described below are simply an example, and the present invention is not limited to the present methods.

<Method for Manufacturing Aluminum-Plated Steel Sheet>
(Immersion in Plating Bath)

An Al plating layer is formed on a surface of a steel sheet by, for example, a hot-dip plating method. The plating layer (Al plating layer) in the aluminum-plated steel sheet is formed on one surface or both surfaces of the steel sheet.

During hot-dip plating, a heating step for hot stamping, or the like, at least some of Al that is contained in the Al plating layer is capable of alloying with Fe in the steel sheet. Therefore, the Al plating layer is not always formed as a single layer containing constant components and may include an appropriately-alloyed layer.

In the hot-dip plating method, Al and the A group elements are added to a hot-dip plating bath. In addition, Si may also be added to the hot-dip plating bath. The amount of the A group elements being added to the hot-dip plating bath is set to 0.001 mass % or more and 30.00 mass % or less, and the Si content being added to the hot-dip plating bath is set to 20.0 mass % or less. The steel sheet is immersed in the hot-dip plating bath to which Al, the A group elements, and, as necessary, Si are added, thereby forming an Al plating layer on the surface of the steel sheet. The formed Al plating layer contains the A group elements. In addition, there is a case where Si is also contained.

In addition, after the immersion in the plating bath, the adhesion amount of the plating is adjusted by gas wiping or the like, but the atmosphere (particularly, the oxygen concentration) during the gas wiping affects the concentration of the A group elements. In the case of increasing the ratio between the maximum value of the detection intensities of the A group elements in the range (surface to t/3) from the outermost surface of the plating layer to the ⅓ thickness t position and the average value of the detection intensities of the A group elements in the range (2t/3 to t) from the ⅔ thickness t position to the thickness t position, the oxygen concentration in the atmosphere during the gas wiping is preferably set to more than 5 vol %, and the atmosphere having an oxygen concentration of approximately 20 vol % is more preferable.

(Spraying of Particles)

Next, the particles of a nitride, a carbide, an oxide, or the like are sprayed to the steel sheet immediately after being lifted from the hot-dip plating bath together with a cooling gas such as an air, nitrogen, or argon before the solidification of molten metal (plating metal in a molten state) attached to the steel sheet by the immersion in the hot-dip plating bath. The sprayed particles act as the nuclei of crystals and have an effect of, in the solidified plating metal, decreasing the grain sizes in the Al plating layer. This effect is particularly strong on the surface side on which the particles are sprayed.

A decrease in the grain sizes in the Al plating layer increases the number of grain boundaries and increases the interface area with the atmospheric gas such as the atmospheric air during heating in hot stamping that is subsequently performed. Since the A group elements have a high affinity to the atmospheric gas, the A group elements concentrate in the surface layer area of the plating layer during heating for hot stamping, and the proportion of the A group elements in the outermost surface of the oxide film layer in the hot-stamped member becomes high.

The spraying rate of the particles is preferably set to 30 to 70 m/s in a direction perpendicular to the surface of the steel sheet. The sprayed particles have an effect of cooling the plating metal in a molten state at the same time as the particles become the nuclei of crystals. In a case where the spraying rate of the particles is less than 30 m/s, the interface area with the plating metal that the sprayed particles come into contact with per unit time is small. Therefore, the cooling rate is insufficient, and the number of the nuclei of crystals becomes small. As a result, the crystal grain size becomes large even after hot stamping, and the coating material adhesion and the corrosion resistance after coating are poor. On the other hand, when the spraying rate of the particles is higher than 70 m/s, the unevenness of the plating metal becomes significant due to the spraying of the particles. Therefore, the unevenness becomes excessively significant even after hot stamping, and the corrosion resistance after coating degrades.

The sizes of the particles of the sprayed nitride, carbide, oxide, or the like are not particularly limited. However, when the grain sizes exceed 20 μm, crystal grains in the Al plating layer become large, and the A group elements are less likely to concentrate in the surface layer during hot stamping. Therefore, the particles desirably have a grain size of 20 μm or less. As the nitride, carbide, and oxide to be sprayed, titanium nitride, silicon nitride, titanium carbide, silicon carbide, titanium oxide, silicon oxide, iron oxide, aluminum oxide, and the like are exemplified. The adhesion amount of the particles is preferably set to, for example, 0.01 to 1.0 g/m². When the adhesion amount of the particles is in this range, a sufficient amount of the nuclei of crystals are formed in the Al plating layer, particularly, in the surface layer area of the plating layer. Therefore, the grain sizes in the Al plating layer become sufficiently small, and it is possible to concentrate the A group elements in the surface layer area of the oxide film layer by heating during hot stamping.

<Method for Manufacturing Hot-Stamped Member>

Hot stamping is performed on the aluminum-plated steel sheet manufactured as described above, thereby obtaining a hot-stamped member. In the hot stamping method, the aluminum-plated steel sheet is blanked (punched) as necessary, and then the aluminum-plated steel sheet is heated and softened. In addition, the softened aluminum-plated steel sheet is formed by pressing and then cooled. The softened aluminum-plated steel sheet may be formed and cooled at the same time. The steel sheet is quenched by heating and cooling, thereby obtaining a high tensile strength of approximately 1000 MPa or more. As a heating method, it is possible to employ infrared heating or the like in addition to an ordinary electric furnace or an ordinary radiant tube furnace.

The heating temperature and the heating time during the hot stamping are preferably set to 850° C. to 950° C. for 2 minutes or longer in the case of the atmosphere. When the heating time is shorter than 2 minutes, since the A group elements do not concentrate in the oxide film layer, the coating material adhesion or pitting corrosion resistance improvement effect of the hot-stamped member is likely to be insufficient.

In addition, in the case of hot-stamping the aluminum-plated steel in an atmosphere having an oxygen concentration of 5% or less, the heating time is preferably set to 3 minutes or longer. In a case where the oxygen concentration is low, when the heating time is shorter than 3 minutes, the thickness of the oxide film layer does not become sufficiently large. Therefore, the proportion of the A group elements in the oxide film layer 3 or the concentration of the A group elements in the surface layer area of the oxide film layer becomes insufficient.

The upper limit of the heating time does not need to be limited, but is preferably 10 minutes or shorter. When the upper limit is longer than 10 minutes, the productivity becomes poor, and the hot stamping method becomes economically disadvantageous.

Hot stamping changes the Al plating layer to an Al—Fe intermetallic compound layer and forms an oxide film layer on the surface of the Al—Fe intermetallic compound layer. Heating during hot stamping melts the Al plating layer and causes Fe to diffuse from the steel sheet, thereby forming an Al—Fe intermetallic compound layer containing an Al—Fe alloy phase or an Al—Fe—Si alloy phase. The Al—Fe intermetallic compound layer is not always formed as a single layer having a constant composition and may include a partially-alloyed layer.

In addition, the A group elements contained in the Al plating layer concentrate in the surface layer of the Al plating layer, and oxygen in the atmosphere oxidizes the surface of the Al plating layer, thereby forming an oxide film layer containing the A group elements. The spraying of the particles forms a sufficient amount of the nuclei of crystals in the Al plating layer, particularly, in the surface layer area. Therefore, the grain sizes in the Al plating layer become sufficiently small, and it is possible to concentrate the A group elements by heating in hot stamping in the surface layer area of the oxide film layer that is formed by hot stamping. All of the A group elements added to the Al plating layer may transfer to the oxide film layer or some of the A group elements may remain in the Al—Fe intermetallic compound layer and the remainder may transfer to the oxide film layer.

In addition, the hot-stamped member according to the present embodiment may also be manufactured by forming an Al-coated layer containing the A group elements by attaching Al and the A group elements to a surface of a steel sheet by deposition or hot spraying instead of hot-dip plating and, furthermore, hot-stamping the steel sheet having this Al-coated layer.

In addition, as an example of the method for forming the Al-coated layer, Al may be attached to the steel sheet first by deposition or hot spraying, and then the A group elements may be attached to the steel sheet. In such a case, an Al-coated layer including an Al layer and the A group elements is formed.

In addition, as another example of the method for forming the Al-coated layer, Al and the A group elements may be attached to the steel sheet at the same time by performing deposition or hot spraying using a deposition source or a hot spraying source containing the A group elements. The proportion of the A group elements in the Al-coated layer is preferably 0.001% to 30.00 mass %.

After that, similar to the case of the aluminum-plated steel sheet, hot stamping is performed on the steel sheet having the Al-coated layer, whereby it is possible to manufacture a hot-stamped member having an oxide film layer containing the A group elements, Al, and oxygen.

EXAMPLES

Hereinafter, examples of the present invention will be described, but conditions in the examples are examples of the conditions employed to confirm the feasibility and effect of the present invention, and the present invention is not limited to the examples of the conditions. The present invention is capable of employing a variety of conditions within the scope of the gist of the present invention as long as the object of the present invention is achieved.

As a steel sheet before plating, a steel sheet having a high mechanical strength (which means a variety of properties relating to mechanical distortion and fracture such as a tensile strength, an yield point, an elongation, a reduction in area, an impact value, and a fatigue strength) is desirably used. Table 1 shows the chemical compositions of steel sheets before plating that were used as the steel sheet of the present invention.

On each of the obtained plated steel sheets, the component analysis of the plating layer was performed according to JIS G3314: 2011, the thickness of the plating layer was measured by GDS, and the average grain size in a thickness range from the outermost surface of the plating layer to a ⅔ thickness t position was obtained by SEM observation after Nital corrosion.

The results are shown in Table 2A to Table 2C and Table 3. The remainder of the plating layer was Al and impurities.

In addition, in some of the aluminum-plated steel sheets (the reference symbols B1 to B11), furthermore, the A group

TABLE 1

| Steel No. | Chemical composition (mass %), remainder is iron and impurity | | | | | | | | | | | | | | | |
|---|---|---|---|---|---|---|---|---|---|---|---|---|---|---|---|---|
| | C | Si | Mn | P | S | Al | Ti | B | N | Cr | Mo | Cu | Ni | Nb | Sn | Ca |
| S1 | 0.1 | 0.21 | 1.21 | 0.02 | 0.005 | 0.05 | 0.02 | 0.0030 | 0.005 | — | — | — | — | — | — | — |
| S2 | 0.4 | 0.01 | 1.01 | 0.04 | 0.010 | 0.03 | 0.04 | 0.0022 | 0.004 | — | — | — | — | — | — | — |
| S3 | 0.2 | 0.60 | 0.90 | 0.03 | 0.010 | 0.04 | 0.03 | 0.0022 | 0.003 | — | — | — | — | — | — | — |
| S4 | 0.3 | 0.01 | 0.50 | 0.04 | 0.010 | 0.04 | 0.04 | 0.0022 | 0.008 | — | — | — | — | — | — | — |
| S5 | 0.2 | 0.60 | 3.00 | 0.03 | 0.004 | 0.01 | 0.03 | 0.0030 | 0.003 | — | — | — | — | — | — | — |
| S6 | 0.2 | 0.21 | 1.01 | 0.05 | 0.004 | 0.01 | 0.02 | 0.0030 | 0.004 | — | — | — | — | — | — | — |
| S7 | 0.2 | 0.01 | 0.90 | 0.01 | 0.020 | 0.03 | 0.02 | 0.0030 | 0.009 | — | — | — | — | — | — | — |
| S8 | 0.2 | 0.60 | 1.01 | 0.01 | 0.004 | 0.10 | 0.02 | 0.0025 | 0.004 | — | — | — | — | — | — | — |
| S9 | 0.2 | 0.21 | 1.05 | 0.03 | 0.004 | 0.03 | 0.01 | 0.0029 | 0.005 | — | — | — | — | — | — | — |
| S10 | 0.2 | 0.23 | 0.90 | 0.04 | 0.004 | 0.03 | 0.10 | 0.0087 | 0.005 | — | — | — | — | — | — | — |
| S11 | 0.2 | 0.25 | 0.95 | 0.03 | 0.004 | 0.01 | 0.04 | 0.0001 | 0.003 | — | — | — | — | — | — | — |
| S12 | 0.3 | 0.21 | 2.01 | 0.04 | 0.004 | 0.01 | 0.03 | 0.0100 | 0.004 | — | — | — | — | — | — | — |
| S13 | 0.3 | 0.03 | 0.90 | 0.02 | 0.010 | 0.01 | 0.02 | 0.0048 | 0.010 | — | — | — | — | — | — | — |
| S14 | 0.3 | 0.01 | 0.95 | 0.02 | 0.010 | 0.03 | 0.02 | 0.0048 | 0.005 | — | — | — | — | — | — | — |
| S15 | 0.2 | 0.21 | 0.90 | 0.04 | 0.010 | 0.03 | 0.02 | 0.0029 | 0.008 | — | — | — | — | — | — | — |
| S16 | 0.3 | 0.12 | 0.50 | 0.04 | 0.008 | 0.04 | 0.04 | 0.0022 | 0.008 | 0.22 | — | — | — | — | — | — |
| S17 | 0.3 | 0.13 | 0.51 | 0.04 | 0.008 | 0.04 | 0.04 | 0.0022 | 0.008 | — | 0.21 | — | — | — | — | — |
| S18 | 0.3 | 0.14 | 0.53 | 0.04 | 0.009 | 0.04 | 0.04 | 0.0022 | 0.008 | 0.24 | 0.24 | — | — | — | — | — |
| S19 | 0.2 | 0.21 | 1.05 | 0.03 | 0.004 | 0.03 | 0.02 | 0.0087 | 0.006 | — | — | 0.11 | — | — | — | — |
| S20 | 0.2 | 0.21 | 0.90 | 0.02 | 0.008 | 0.03 | 0.02 | 0.0089 | 0.004 | — | — | — | 0.15 | — | — | — |
| S21 | 0.2 | 0.25 | 0.50 | 0.03 | 0.004 | 0.04 | 0.02 | 0.0030 | 0.005 | — | — | — | — | 0.18 | — | — |
| S22 | 0.2 | 0.21 | 0.51 | 0.04 | 0.010 | 0.04 | 0.04 | 0.0025 | 0.009 | — | — | — | — | — | 0.12 | — |
| S23 | 0.2 | 0.14 | 0.90 | 0.04 | 0.004 | 0.03 | 0.03 | 0.0029 | 0.008 | — | — | — | — | — | — | 0.04 |

In each of reference symbols A1 to A66, a1 to a10, and B1 to B11 in which a steel sheet having a chemical composition shown in Table 1 (one of the steels Nos. S1 to S23) was used, Al plating layers were formed on both surfaces of the steel sheet by a hot-dip plating method. During hot-dip plating, the plating bath temperature was set to 700° C., and, after the steel sheet was immersed in the plating bath, the adhesion amount was adjusted to 16 to 115 g/m² per surface by a gas wiping method. After that, in each of the examples except for the reference symbols a4 and a5, titanium oxide having a grain size of 0.05 μm was sprayed at a spraying rate shown in Table 2A, Table 2B, and Table 2C before the solidification of the plating layer such that the average adhesion amount reached 0.1 g/m². On the reference symbols a4 and a5, the spraying of the particles was not performed. As the atmosphere during the gas wiping, the ordinary atmosphere was used except for the reference symbols B1, B4, and B8. For the reference symbols B1, B4, and B8, the oxygen concentration was set to 5 vol %, and the nitrogen concentration was set to 95 vol % in the atmosphere during the gas wiping, and the oxygen concentration was set to be lower than that of the ordinary atmosphere.

As shown in Table 2A to Table 2C and Table 3, 0.001% or more and 30.00% or less, by mass %, of the A group elements were added to the plating bath. As the A group elements, one or more of Sc, Ti, V, Cr, Mn, Fe, Co, Ni, Cu, Zn, Mg, Ca, Ba, Sr, and Be were selected. In a case where a plurality of the A group elements was contained in Table 2B, the respective content (unit: mass %) is described. The remainder of the plating bath was Al and impurities.

elements were measured using GDS at intervals of 0.1 seconds and a sputtering rate of 0.060 μm/second, and I(M)/I(A) that is the ratio of the maximum value of the detection intensities of the A group elements in a range (surface to t/3) from the outermost surface of the plating layer to a ⅓ thickness t position to the average value of the detection intensities of the A group elements in a range (2t/3 to t) from the ⅔ thickness t position to a thickness t position was obtained.

The results are shown in Table 3.

After that, the aluminum-plated steel sheets were heated in an electric resistance furnace having a furnace temperature of 900° C. and the atmospheric air such that the soaking time reached 5 minutes. After that, the Al-plated steel sheets were formed with a die and cooled in the die at the same time, thereby obtaining hot-stamped members.

For the obtained hot-stamped members, the coating material adhesion and the corrosion resistance after coating were investigated by methods described below. The results are shown in Table 2A to Table 2C and Table 3.

While not shown in the tables, for all of the examples, the thicknesses of the Al—Fe intermetallic compound layers were in a range of 0.1 to 10.0 μm.

(1) Coating Material Adhesion

The coating material adhesion was evaluated according to the method described in Japanese Patent No. 4373778. That is, the coating material adhesion was graded based on the area ratio computed by immersing a sample in deionized water (60° C.) for 240 hours, then, inscribing 100 grids at intervals of 1 mm using a cutter knife, and visually measuring the number of exfoliated portions in the grid portions.
[Grades]
  3: The exfoliated area is 0% or more and less than 10%.
  2: The exfoliated area is 10% or more and less than 70%.
  1: The exfoliated area is 70% or more and 100% or less.
(2) Corrosion Resistance after Coating The corrosion resistance after coating was evaluated by the neutral salt spray cycle test method specified in JIS H8502: 1999. A cross-cut mark was inscribed in a coating film using a diamond cutter knife, and the width (the single-side maximum value) of the coating film swollen from the cut mark after 180 cycles of a corrosion test was measured. When the evaluation was 2 or 3 based on the following standards, the corrosion resistance after coating was determined as excellent.
(Evaluation)
  3: The swollen width is 0 mm or more and less than 1.5 mm.
  2: The swollen width is 1.5 mm or more and less than 3 mm.
  1: The swollen width is 3 mm or more.

Invention Examples A1 to A66 and B1 to B11 were excellent in terms of the coating material adhesion. As a result, the corrosion resistance after coating was also excellent. In contrast, in Comparative Examples a1 in which the plating layer did not contain the A group elements and a2, a3, a6, a7, a8, a9, and a10 in which the thickness and/or the grain sizes of the plating layer were outside the scope of the invention, the coating material adhesion and the corrosion resistance after coating were poor. In addition, in a4 and a5, since the spraying of the particles was not performed, the average grain size of the plating layer was large. As a result, the A group elements did not concentrate in the surface layer area of the oxide film layer, and the coating material adhesion and the corrosion resistance after coating were poor.

TABLE 2A

|  | Reference symbol | Steel No. | Plating bath | | | | Particle spraying Spraying rate m/s | Plating layer | |
|---|---|---|---|---|---|---|---|---|---|
|  |  |  | A group element Mass % | Kind of A group element — | Si Mass % | Fe Mass % |  | A group element Mass % | Kind of A group element — |
| Invention Example | A1 | S1 | 29.12 | Sc | 8.1 | 2.6 | 30 | 30.00 | Sc |
|  | A2 | S1 | 10.10 | Ti | 8.4 | 0.0 | 35 | 8.04 | Ti |
|  | A3 | S1 | 0.25 | V | 8.5 | 2.5 | 40 | 0.16 | V |
|  | A4 | S2 | 1.14 | Cr | 8.6 | 3.1 | 38 | 1.05 | Cr |
|  | A5 | S3 | 2.16 | Mn | 10.1 | 1.2 | 37 | 1.64 | Mn |
|  | A6 | S4 | 1.15 | Fe | 9.5 | 1.2 | 67 | 0.18 | Fe |
|  | A7 | S5 | 0.18 | Co | 8.1 | 5.0 | 37 | 0.16 | Co |
|  | A8 | S6 | 0.22 | Ni | 10.0 | 1.3 | 49 | 0.19 | Ni |
|  | A9 | S7 | 0.38 | Cu | 9.6 | 2.9 | 60 | 0.23 | Cu |
|  | A10 | S8 | 0.36 | Zn | 10.1 | 4.5 | 70 | 0.25 | Zn |
|  | A11 | S9 | 0.34 | Mg | 11.4 | 0.2 | 50 | 0.27 | Mg |
|  | A12 | S10 | 0.05 | Ca | 12.1 | 0.9 | 30 | 0.04 | Ca |
|  | A13 | S1 | 0.33 | Ba | 11.6 | 1.3 | 32 | 0.28 | Ba |
|  | A14 | S11 | 0.04 | Sr | 9.8 | 4.3 | 31 | 0.03 | Sr |
|  | A15 | S12 | 0.10 | Ti | 7.9 | 2.6 | 38 | 0.10 | Ti |
|  | A16 | S13 | 0.50 | Ti | 9.5 | 3.8 | 34 | 0.31 | Ti |
|  | A17 | S14 | 1.49 | Ti | 5.7 | 1.3 | 45 | 1.16 | Ti |
|  | A18 | S15 | 3.00 | Ti | 20.0 | 0.0 | 49 | 2.90 | Ti |
|  | A19 | S16 | 0.10 | Mg | 14.5 | 2.9 | 51 | 0.10 | Mg |
|  | A20 | S17 | 0.30 | Mg | 10.7 | 3.8 | 31 | 0.26 | Mg |
|  | A21 | S18 | 30.00 | Mg | 0.0 | 1.1 | 42 | 29.16 | Mg |
|  | A22 | S19 | 0.34 | Mg | 8.6 | 2.8 | 49 | 0.27 | Mg |
|  | A23 | S20 | 0.09 | Mg | 7.1 | 3.3 | 43 | 0.07 | Mg |
|  | A24 | S21 | 0.24 | Ca | 9.5 | 2.5 | 39 | 0.22 | Ca |
|  | A25 | S22 | 0.15 | Mg | 9.4 | 2.8 | 51 | 0.14 | Mg |

|  | Reference symbol | Plating layer | | | | Hot-stamped member | |
|---|---|---|---|---|---|---|---|
|  |  | Si Mass % | Fe Mass % | Thickness t [μm] | Average grain size from surface to ⅔ thickness t portion (μm) | Coating material adhesion | Corrosion resistance after coating |
| Invention Example | A1 | 8.1 | 2.8 | 20 | 12.0 | 3 | 3 |
|  | A2 | 8.3 | 0.1 | 30 | 14.0 | 3 | 3 |
|  | A3 | 8.6 | 3.4 | 40 | 15.0 | 3 | 2 |
|  | A4 | 8.7 | 3.7 | 32 | 14.2 | 3 | 3 |
|  | A5 | 10.1 | 1.9 | 30 | 14.5 | 3 | 3 |
|  | A6 | 9.5 | 2.8 | 10 | 6.6 | 3 | 3 |
|  | A7 | 8.1 | 5.0 | 30 | 11.1 | 3 | 3 |
|  | A8 | 10.0 | 2.1 | 34 | 14.0 | 3 | 3 |
|  | A9 | 9.6 | 3.6 | 23 | 6.8 | 3 | 3 |
|  | A10 | 10.1 | 4.6 | 13 | 8.1 | 3 | 3 |
|  | A11 | 11.4 | 2.4 | 45 | 15.0 | 3 | 3 |
|  | A12 | 12.1 | 1.9 | 60 | 14.8 | 3 | 2 |
|  | A13 | 11.6 | 2.8 | 56 | 14.8 | 2 | 3 |
|  | A14 | 9.8 | 4.3 | 60 | 15.0 | 3 | 2 |
|  | A15 | 7.9 | 2.8 | 60 | 15.0 | 2 | 2 |

TABLE 2A-continued

| | | | | | | |
|---|---|---|---|---|---|---|
| A16 | 9.5 | 4.1 | 46 | 14.5 | 2 | 2 |
| A17 | 5.7 | 1.6 | 33 | 12.3 | 3 | 3 |
| A18 | 20.0 | 0.1 | 10 | 6.4 | 3 | 3 |
| A19 | 14.5 | 3.4 | 10 | 6.5 | 3 | 3 |
| A20 | 10.7 | 3.9 | 35 | 11.1 | 3 | 3 |
| A21 | 0.0 | 1.4 | 60 | 14.5 | 3 | 3 |
| A22 | 8.7 | 3.4 | 30 | 9.1 | 3 | 3 |
| A23 | 7.1 | 3.8 | 34 | 11.1 | 3 | 3 |
| A24 | 9.5 | 2.9 | 30 | 8.9 | 3 | 3 |
| A25 | 9.4 | 3.5 | 34 | 7.4 | 3 | 3 |

TABLE 2B

| | Reference symbol | Steel No. | Plating bath A group element Mass % | Plating bath Kind of A group element — | Plating bath Si Mass % | Plating bath Fe Mass % | Particle spraying Spraying rate m/s | Plating layer A group element Mass % | Plating layer Kind of A group element — |
|---|---|---|---|---|---|---|---|---|---|
| Invention Example | A26 | S23 | 1.29 | Mg | 10.8 | 3.1 | 44 | 1.10 | Mg |
| | A27 | S15 | 0.05 | Mg | 0.0 | 0.4 | 41 | 0.05 | Mg |
| | A28 | S16 | 0.10 | Mg | 0.0 | 0.5 | 51 | 0.11 | Mg |
| | A29 | S4 | 1.10 | Mg | 0.0 | 0.3 | 36 | 1.03 | Mg |
| | A30 | S1 | 3.10 | Cr | 9.1 | 2.6 | 70 | 3.04 | Cr |
| | A31 | S5 | 1.10 | Cr | 9.4 | 2.6 | 50 | 1.01 | Cr |
| | A32 | S6 | 10.33 | Cr | 9.9 | 2.9 | 60 | 9.89 | Cr |
| | A33 | S7 | 0.46 | Cr | 9.2 | 3.5 | 34 | 0.39 | Cr |
| | A34 | S7 | 0.32 | Sr | 9.4 | 1.9 | 32 | 0.26 | Sr |
| | A35 | S8 | 0.25 | Sr | 8.6 | 1.4 | 33 | 0.23 | Sr |
| | A36 | S9 | 0.91 | Sr | 8.1 | 4.1 | 38 | 0.82 | Sr |
| | A37 | S10 | 1.26 | Sr | 10.7 | 4.9 | 52 | 1.16 | Sr |
| | A38 | S8 | 1.16 | Ca | 10.1 | 0.4 | 70 | 0.89 | Ca |
| | A39 | S9 | 0.35 | Ca | 10.1 | 1.7 | 55 | 0.28 | Ca |
| | A40 | S10 | 0.26 | Ca | 9.5 | 3.1 | 41 | 0.23 | Ca |
| | A41 | S8 | 0.21 | Ca | 9.1 | 4.1 | 34 | 0.20 | Ca |
| | A42 | S9 | 0.36 | Co | 8.1 | 3.6 | 70 | 0.28 | Co |
| | A43 | S4 | 0.35 | Co | 7.9 | 3.9 | 66 | 0.27 | Co |
| | A44 | S5 | 0.22 | Co | 9.1 | 2.4 | 64 | 0.19 | Co |
| | A45 | S9 | 0.27 | Co | 8.5 | 2.1 | 36 | 0.24 | Co |
| | A46 | S7 | 29.19 | Mg | 11.1 | 4.2 | 70 | 30.00 | Mg |
| | A47 | S8 | 0.97 | Mg | 12.1 | 1.7 | 61 | 0.87 | Mg |
| | A48 | S9 | 5.12 | Mg | 9.0 | 1.1 | 32 | 5.14 | Mg |
| | A49 | S10 | 0.45 | Mg | 9.1 | 0.8 | 30 | 6.32 | Mg |
| | A50 | S10 | 1.07 | Mg | 9.5 | 0.5 | 35 | 1.00 | Mg |

| | Reference symbol | Plating layer Si Mass % | Plating layer Fe Mass % | Plating layer Thickness t [μm] | Plating layer Average grain size from surface to 2/3 thickness t portion (μm) | Hot-stamped member Coating material adhesion — | Hot-stamped member Corrosion resistance after coating — |
|---|---|---|---|---|---|---|---|
| Invention Example | A26 | 10.8 | 3.2 | 23 | 6.8 | 3 | 3 |
| | A27 | 0.0 | 5.1 | 32 | 8.1 | 3 | 3 |
| | A28 | 0.0 | 6.1 | 35 | 7.0 | 3 | 3 |
| | A29 | 0.0 | 5.6 | 34 | 6.9 | 3 | 3 |
| | A30 | 9.1 | 3.1 | 10 | 6.6 | 3 | 3 |
| | A31 | 9.4 | 2.7 | 24 | 7.5 | 3 | 3 |
| | A32 | 9.9 | 2.8 | 55 | 8.6 | 3 | 3 |
| | A33 | 9.4 | 3.4 | 60 | 15.0 | 3 | 3 |
| | A34 | 9.4 | 2.6 | 10 | 4.5 | 3 | 3 |
| | A35 | 8.8 | 2.7 | 33 | 8.9 | 3 | 3 |
| | A36 | 8.4 | 3.7 | 55 | 14.2 | 3 | 3 |
| | A37 | 10.1 | 4.8 | 60 | 15.0 | 3 | 3 |
| | A38 | 10.8 | 1.7 | 10 | 6.5 | 3 | 3 |
| | A39 | 10.1 | 3.1 | 15 | 8.0 | 3 | 3 |
| | A40 | 9.5 | 3.6 | 27 | 10.7 | 3 | 3 |
| | A41 | 9.1 | 4.3 | 60 | 15.0 | 3 | 3 |
| | A42 | 8.1 | 4.7 | 10 | 4.1 | 3 | 3 |
| | A43 | 7.9 | 4.1 | 29 | 5.9 | 3 | 3 |
| | A44 | 9.1 | 2.5 | 55 | 6.8 | 3 | 3 |
| | A45 | 8.5 | 2.1 | 60 | 14.3 | 3 | 3 |
| | A46 | 11.1 | 4.6 | 10 | 3.4 | 3 | 3 |
| | A47 | 12.1 | 2.4 | 28 | 4.6 | 3 | 3 |
| | A48 | 9.0 | 1.5 | 55 | 14.1 | 3 | 3 |

TABLE 2B-continued

| | | | | | | |
|---|---|---|---|---|---|---|
| A49 | 9.1 | 1.1 | 55 | 12.8 | 3 | 3 |
| A50 | 9.5 | 1.0 | 60 | 13.9 | 3 | 3 |

TABLE 2C

| | | | Plating bath | | | | Particle | Plating layer | |
|---|---|---|---|---|---|---|---|---|---|
| | Reference symbol | Steel No. | A group element Mass % | Kind of A group element — | Si Mass % | Fe Mass % | spraying Spraying rate m/s | A group element Mass % | Kind of A group element — |
| Invention Example | A51 | S8 | 1.22 | Mn | 9.6 | 3.8 | 70 | 1.12 | Mn |
| | A52 | S9 | 0.32 | Mn | 9.1 | 4.1 | 54 | 0.30 | Mn |
| | A53 | S10 | 1.06 | Mn | 9.8 | 3.0 | 36 | 0.99 | Mn |
| | A54 | S8 | 0.32 | Mn | 9.1 | 2.6 | 31 | 0.22 | Mn |
| | A55 | S9 | 0.16 | Ti | 9.5 | 4.0 | 70 | 0.15 | Ti |
| | A56 | S4 | 0.56 | Ti | 9.1 | 1.6 | 40 | 0.48 | Ti |
| | A57 | S5 | 0.53 | Ti | 9.1 | 3.7 | 30 | 0.48 | Ti |
| | A58 | S8 | 0.20, 0.22 | Sr, Ca | 9.9 | 2.6 | 70 | 0.16, 0.16 | Sr, Ca |
| | A59 | S9 | 0.28, 0.34 | Sr, Mg | 8.1 | 3.1 | 34 | 0.17, 0.25 | Sr, Mg |
| | A60 | S8 | 0.17, 0.25 | Ca, Mg | 8.5 | 4.3 | 40 | 0.17, 0.24 | Ca, Mg |
| | A61 | S9 | 0.32, 0.52 | Ca, Mg | 8.0 | 3.7 | 39 | 0.28, 0.45 | Ca, Mg |
| | A62 | S8 | 0.19, 0.25 | Ti, Mg | 8.1 | 4.1 | 47 | 0.15, 0.24 | Ti, Mg |
| | A63 | S9 | 0.17, 0.31 | Sr, Ca | 8.8 | 2.5 | 52 | 0.15, 0.29 | Sr, Ca |
| | A64 | S8 | 0.58, 0.15 | Mn, Mg | 8.1 | 3.1 | 60 | 0.55, 0.12 | Mn, Mg |
| | A65 | S9 | 0.42, 0.24 | Mn, Mg | 8.7 | 2.5 | 70 | 0.31, 0.19 | Mn, Mg |
| | A66 | S8 | 0.42 | Be | 8.5 | 2.5 | 42 | 0.39 | Be |
| Comparative Example | a1 | S1 | 0.00 | — | 8.9 | 3.1 | 40 | 0.00 | — |
| | a2 | S1 | 0.21 | Ti | 8.1 | 4.1 | 50 | 0.19 | Ti |
| | a3 | S1 | 0.17 | Ti | 8.5 | 2.4 | 38 | 0.14 | Ti |
| | a4 | S1 | 0.16 | Mg | 9.5 | 2.6 | — | 0.15 | Mg |
| | a5 | S1 | 0.51 | Ca | 9.1 | 1.3 | — | 0.46 | Ca |
| | a6 | S1 | 0.21 | Ca | 8.5 | 2.7 | 34 | 0.21 | Ca |
| | a7 | S1 | 0.39 | Ca | 8.0 | 2.8 | 42 | 0.36 | Ca |
| | a8 | S1 | 0.52 | Ti | 8.9 | 2.1 | 75 | 0.42 | Ti |
| | a9 | S4 | 0.66 | Ti | 8.1 | 3.3 | 90 | 0.62 | Ti |
| | a10 | S1 | 0.71 | Ti | 8.8 | 2.8 | 10 | 0.67 | Ti |

| | | Plating layer | | | | Hot-stamped member | |
|---|---|---|---|---|---|---|---|
| | Reference symbol | Si Mass % | Fe Mass % | Thickness t [μm] | Average grain size from surface to 2/3 thickness t portion (μm) | Coating material adhesion | Corrosion resistance after coating |
| Invention Example | A51 | 9.6 | 3.9 | 10 | 5.4 | 3 | 3 |
| | A52 | 9.1 | 4.3 | 28 | 6.1 | 3 | 3 |
| | A53 | 9.8 | 3.6 | 55 | 6.5 | 3 | 3 |
| | A54 | 9.1 | 2.9 | 60 | 6.4 | 3 | 3 |
| | A55 | 9.5 | 4.5 | 10 | 6.6 | 3 | 3 |
| | A56 | 9.1 | 1.8 | 28 | 3.9 | 3 | 3 |
| | A57 | 9.1 | 4.5 | 60 | 15.0 | 3 | 3 |
| | A58 | 9.9 | 2.7 | 10 | 3.5 | 3 | 3 |
| | A59 | 8.1 | 3.5 | 28 | 3.1 | 3 | 3 |
| | A60 | 8.5 | 4.6 | 55 | 13.3 | 3 | 3 |
| | A61 | 8.0 | 4.5 | 55 | 12.9 | 3 | 3 |
| | A62 | 8.1 | 4.6 | 24 | 5.9 | 3 | 3 |
| | A63 | 8.8 | 2.8 | 30 | 7.4 | 3 | 3 |
| | A64 | 8.1 | 3.7 | 24 | 3.5 | 3 | 3 |
| | A65 | 8.7 | 2.8 | 15 | 2.3 | 3 | 3 |
| | A66 | 8.5 | 2.6 | 31 | 8.2 | 3 | 3 |
| Comparative Example | a1 | 8.9 | 3.5 | <u>7.1</u> | — | 1 | 1 |
| | a2 | 8.1 | 4.5 | <u>5.6</u> | 0.4 | 1 | 1 |
| | a3 | 8.5 | 2.5 | <u>80.0</u> | 13.0 | 1 | 1 |
| | a4 | 9.5 | 3.0 | <u>80.0</u> | <u>23.0</u> | 1 | 1 |
| | a5 | 9.1 | 1.5 | <u>75.0</u> | <u>18.3</u> | 1 | 1 |
| | a6 | 8.5 | 2.9 | <u>8.9</u> | 2.6 | 1 | 1 |
| | a7 | 8.0 | 3.0 | <u>7.1</u> | 2.4 | 1 | 1 |
| | a8 | 8.9 | 2.6 | <u>9.3</u> | 2.0 | 1 | 1 |
| | a9 | 8.1 | 3.6 | <u>9.4</u> | 0.9 | 1 | 1 |
| | a10 | 8.8 | 2.9 | 54.1 | <u>17.5</u> | 1 | 1 |

TABLE 3

| | Reference symbol | Steel No. | Particle spraying Spraying rate m/s | Plating layer | | | | Hot-stamped member | |
|---|---|---|---|---|---|---|---|---|---|
| | | | | Thickness μm | Kind of A group element | A group element Mass % | Si Mass % | I(M)/I(A) — | Coating material adhesion | Corrosion resistance after coating |
| Inventive Example | B1 | S1 | 41 | 34 | Sr | 0.21 | 9.4 | 0.92 | 2 | 3 |
| | B2 | S4 | 39 | 35 | Sr | 0.04 | 8.2 | 2.18 | 3 | 3 |
| | B3 | S7 | 41 | 24 | Sr | 0.08 | 9.5 | 3.11 | 3 | 3 |
| | B4 | S1 | 61 | 18 | Mg | 2.10 | 8.1 | 0.85 | 2 | 3 |
| | B5 | S4 | 31 | 56 | Mg | 0.08 | 8.7 | 2.62 | 3 | 3 |
| | B6 | S7 | 38 | 45 | Mg | 0.06 | 10.3 | 2.81 | 3 | 3 |
| | B7 | S4 | 44 | 29 | Mg | 0.05 | 11.4 | 3.57 | 3 | 3 |
| | B8 | S2 | 42 | 31 | Ca | 0.31 | 7.2 | 0.88 | 2 | 3 |
| | B9 | S11 | 45 | 32 | Ca | 0.09 | 9.1 | 2.56 | 3 | 3 |
| | B10 | S8 | 39 | 28 | Ca | 0.06 | 10.0 | 3.12 | 3 | 3 |
| | B11 | S9 | 68 | 13 | Ca | 0.03 | 9.5 | 3.57 | 3 | 3 |

Hitherto, the preferable embodiment of the present invention has been described in detail, but it is needless to say that the present invention is not limited to such examples. It is clear that a person skilled in the art is able to conceive a variety of modification examples or correction examples in the scope of the technical concept described in the claims, and it is also needless to say that such examples also belong to the technical scope of the present invention.

INDUSTRIAL APPLICABILITY

According to the present invention, it is possible to provide an aluminum-plated steel sheet having excellent adhesion to an electrodeposition coating film (coating material adhesion). Therefore, the present invention is highly industrially applicable.

The invention claimed is:

1. An aluminum-plated steel sheet comprising:
a steel sheet; and
a plating layer formed on a surface of the steel sheet,
wherein a chemical composition of the plating layer is, by mass %,
a total content of one or more A group elements selected from Be, Mg, Ca, Sr, Ba, Sc, Ti, V, Cr, Mn, Co, Ni, Cu, and Zn: 0.001% to 30.00%,
Si: 0% to 20.0%,
Fe: 0% to 10.0%, and
a remainder: Al and impurities,
a thickness t of the plating layer is 10 to 60 μm, and
an average grain size is the smaller of 2t/3 or less and 15 μm or less in a thickness range from an outermost surface of the plating layer to a ⅔ thickness t position,
wherein, in a case of measuring the A group elements in the plating layer in a thickness direction from the outermost surface of the plating layer using GDS,
a maximum value of detection intensities of the A group elements in a range from the outermost surface of the plating layer to a ⅓ thickness t position is 2.0 times or more an average value of detection intensities of the A group elements in a range from the ⅔ thickness t position to a thickness t position.

2. The aluminum-plated steel sheet according to claim 1, wherein, in the chemical composition of the plating layer, by mass %,
a total of a Sr content, a Mg content, and a Ca content is less than 0.001%, and
a total content of the A group elements is 0.05% to 30.00%.

3. The aluminum-plated steel sheet according to claim 1, wherein a chemical composition of the steel sheet is, by mass %,
C: 0.1% to 0.4%,
Si: 0.01% to 0.60%,
Mn: 0.50% to 3.00%,
P: 0.05% or less,
S: 0.020% or less,
Al: 0.10% or less,
Ti: 0.01% to 0.10%,
B: 0.0001% to 0.0100%,
N: 0.010% or less,
Cr: 0% to 1.00%,
Mo: 0% to 1.00%,
Cu: 0% to 1.00%,
Ni: 0% to 2.00%,
Nb: 0% to 1.00%,
Sn: 0% to 1.00%,
Ca: 0% to 0.10%, and
a remainder: Fe and impurities.

4. The aluminum-plated steel sheet according to claim 1, wherein the plating layer contains one or more A group elements selected from Be, Ca, Sr, Ba, Sc, V, Mn, Fe, Co, Ni, and Cu, and a remainder of Al, Fe, and impurities.

5. A hot-stamped member comprising the aluminum-plated steel sheet according to claim 1, the hot-stamped member comprising:
an oxide film layer containing one or more A group elements selected from Be, Mg, Ca, Sr, Ba, Sc, Ti, V, Cr, Mn, Fe, Co, Ni, Cu, and Zn, Al, and oxygen in a surface.

6. A hot-stamped member comprising the aluminum-plated steel sheet according to claim 4, the hot-stamped member comprising:
an oxide film layer containing one or more A group elements selected from Be, Ca, Sr, Ba, Sc, V, Mn, Fe, Co, Ni, and Cu, Al, and oxygen in a surface.

* * * * *